US010371984B2

(12) United States Patent
Song et al.

(10) Patent No.: US 10,371,984 B2
(45) Date of Patent: Aug. 6, 2019

(54) COLOR FILTER AND DISPLAY DEVICE INCLUDING THE SAME

(71) Applicant: SAMSUNG DISPLAY CO., LTD., Yongin-si, Gyeonggi-do (KR)

(72) Inventors: Dokeun Song, Yongin-si (KR); Joonyong Park, Yongin-si (KR); Sangwon Shin, Yongin-si (KR); Dongmin Lee, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 17 days.

(21) Appl. No.: 15/690,594

(22) Filed: Aug. 30, 2017

(65) Prior Publication Data

US 2018/0088261 A1 Mar. 29, 2018

(30) Foreign Application Priority Data

Sep. 28, 2016 (KR) ........................ 10-2016-0125099

(51) Int. Cl.
*G02F 1/1335* (2006.01)

(52) U.S. Cl.
CPC .. *G02F 1/133514* (2013.01); *G02F 1/133512* (2013.01); *G02F 2001/133614* (2013.01); *G02F 2202/36* (2013.01)

(58) Field of Classification Search
CPC ..................... G02F 1/133512; G02F 1/133514
See application file for complete search history.

(56) References Cited

U.S. PATENT DOCUMENTS

| | | | | |
|---|---|---|---|---|
| 8,564,746 | B2 | 10/2013 | Kim et al. | |
| 2002/0090494 | A1 * | 7/2002 | Song ...................... | G02B 5/201 428/167 |
| 2013/0010229 | A1 | 1/2013 | Shin et al. | |
| 2016/0109750 | A1 | 4/2016 | Kim et al. | |
| 2016/0131938 | A1 | 5/2016 | Ji et al. | |
| 2017/0059940 | A1 * | 3/2017 | Kim .................. | G02F 1/133617 |

FOREIGN PATENT DOCUMENTS

| | | |
|---|---|---|
| KR | 10-2012-0042526 | 5/2012 |
| KR | 10-2013-0005175 | 1/2013 |
| KR | 10-2016-0009669 | 1/2016 |
| KR | 10-2016-0047032 | 5/2016 |
| KR | 10-2016-0060319 | 5/2016 |

* cited by examiner

*Primary Examiner* — Phu Vu
(74) *Attorney, Agent, or Firm* — F. Chau & Associates, LLC

(57) ABSTRACT

A color filter includes a substrate including a first surface having a first pixel area and a second pixel area spaced apart from each other and a light blocking area positioned between the first pixel area and the second pixel area. The light blocking area includes a trench. The color filter further includes a first color converter disposed on the first pixel area and configured to convert incident light to light of a first color, a second color converter disposed on the second pixel area and configured to convert the incident light to light of a second color, and a light blocker disposed in the trench.

20 Claims, 12 Drawing Sheets

COLOR FILTER AND DISPLAY DEVICE INCLUDING THE SAME

CROSS-REFERENCE TO RELATED APPLICATION

This application claims priority under 35 U.S.C. § 119 to Korean Patent Application No. 10-2016-0125099, filed on Sep. 28, 2016 in the Korean Intellectual Property Office, the disclosure of which is incorporated by reference herein in its entirety.

TECHNICAL FIELD

One or more exemplary embodiments of the present invention relates to a color filter and a display device including the same.

DISCUSSION OF THE RELATED ART

A liquid crystal display apparatus is a widely-used type of display apparatus and may include a pixel electrode, a common electrode, and a liquid crystal layer disposed therebetween. An electric field is generated in the liquid crystal layer by applying a voltage to the pixel electrode and the common electrode. By applying the electric field, the orientation of liquid crystal molecules in the liquid crystal layer may be determined, and polarization of light incident to the liquid crystal layer may be controlled. Thus, images may be displayed.

The liquid crystal display apparatus may use color filters to display images. When light emitted from a backlight source passes through a red color filter, a green color filter, and a blue color filter, respectively, the amount of light thereof is reduced to about ⅓, which results in low efficiency of light.

A photo-luminescent liquid crystal display (PL-LCD) apparatus may be used to compensate for a decrease in light efficiency while exhibiting a high color reproducibility. The PL-LCD is a liquid crystal display apparatus in which color filters are replaced by a quantum dot color converting layer (QD-CCL). The PL-LCD displays a color image by using visible rays generated when light of a low wavelength, such as ultraviolet light or blue light generated from a light source and controlled by a liquid crystal layer, is irradiated onto a color converting layer (CCL).

A CCL does not transmit light emitted from a light source therethrough like as a color filter, but generates light having a different wavelength from the light emitted from the light source. Therefore, light emitted from the CCL may be irradiated in various directions. As a result, light emitted from adjacent CCLs having different colors may be mixed with each other, thereby causing a mixture of colors. Although a black matrix may be disposed between CCLs to improve color reproducibility, light emitted by the CCLs may be reflected by the black matrix and further contribute to increase in the color mixture. Furthermore, outside light may be reflected by the black matrix and may reduce color reproducibility.

SUMMARY

According to an exemplary embodiment of the present invention, a color filter includes a substrate including a first surface having a first pixel area and a second pixel area spaced apart from each other and a light blocking area positioned between the first pixel area and the second pixel area. The light blocking area includes a trench. The color filter further includes a first color converter disposed on the first pixel area and configured to convert incident light to light of a first color, a second color converter disposed on the second pixel area and configured to convert the incident light to light of a second color, and a light blocker disposed in the trench.

In an exemplary embodiment of the present invention, the light blocker includes a first surface, which is in contact with an inner wall of the trench and is convex, and a second surface, which faces the first surface and is concave.

In an exemplary embodiment of the present invention, an inner wall of the trench is convex.

In an exemplary embodiment of the present invention, a depth of the trench is constant across a base of the trench.

In an exemplary embodiment of the present invention, a width of the trench decreases from a side of the trench to a center of the trench.

In an exemplary embodiment of the present invention, the light blocker includes a first surface contacting an inner wall of the trench and a second surface. The second surface is opposite to the first surface and is flat.

In an exemplary embodiment of the present invention, the first color converter includes a first color converting layer having first quantum dots that are excited by the incident light and emit the light of the first color, and the second color converter includes a second color converting layer having second quantum dots that are excited by the incident light and emit the light of the second color.

In an exemplary embodiment of the present invention, the color filter further includes a color filter layer disposed between the substrate and the first and second color converting layers. The color filter layer is configured to reflect the incident light.

In an exemplary embodiment of the present invention, the color filter further includes a band pass filter layer disposed on the first and second color converting layers and configured to selectively transmit the incident light therethrough and reflect the light of the first color and the light of the second color.

In an exemplary embodiment of the present invention, the color filter further including a light-blocking sidewall disposed on a portion of the band pass filter layer to surround at least portions of the first and second color converting layers.

In an exemplary embodiment of the present invention, the first color converter further includes a first light-blocking layer disposed between a sidewall of the first color converting layer and the band pass filter layer, and the second color converter further includes a second light-blocking layer disposed between a sidewall of the second color converting layer and the band pass filter layer.

In an exemplary embodiment of the present invention, the color filter further includes a light-blocking sidewall configured to surround at least portions of the first and second color converting layers, and a band pass filter layer disposed on the first and second color converting layers and the light-blocking sidewall. The band pass filter is configured to selectively transmit the incident light therethrough.

In an exemplary embodiment of the present invention, the first color converter further includes a first color filter layer disposed between the substrate and the first color converting layer, the first color filter layer configured to selectively transmit the light of the first color emitted from the first color converting layer therethrough. The second color converter further includes a second color filter layer disposed between the substrate and the second color converting layer, the second color filter layer configured to selectively transmit the light of the second color emitted from the second color converting layer therethrough.

In an exemplary embodiment of the present invention, the color filter further includes a light transmitting layer disposed on a third pixel area spaced apart from the first and second pixel areas. The light transmitting layer configured to transmit the incident light therethrough.

In an exemplary embodiment of the present invention, the color filter further includes a third color converter disposed on a third pixel area spaced apart from the first and second pixel areas. The third color converter configured to convert the incident light to light of a third color.

In an exemplary embodiment of the present invention, the incident light is blue light or ultraviolet light, and the first color and the second color are red and green, respectively.

According to an exemplary embodiment of the present invention, a display apparatus includes a display including first and second pixels, and a color filter overlapping the display and including a first pixel area and a second pixel area. The first pixel area and the second pixel area overlap the first pixel and the second pixel, respectively. The color filter includes a substrate including a first surface having the first pixel area and the second pixel area spaced apart from each other and a light blocking area positioned between the first pixel area and the second pixel area. A trench is provided in the light blocking area. The color filter further includes a first color converter disposed on the first pixel area and configured to convert incident light to light of a first color, a second color converter disposed on the second pixel area and configured to convert the incident light to light of a second color, and a light blocker disposed in the trench.

In an exemplary embodiment of the present invention, the light blocker includes a first surface, which is in contact with an inner wall of the trench and is convex, and a second surface, which faces the first surface and is concave.

In an exemplary embodiment of the present invention, display apparatus further includes a backlight device configured to irradiate the incident light toward the color filter, and a liquid crystal layer disposed between the first and second pixels and the color filter.

In an exemplary embodiment of the present invention, each of the first and second pixels include an organic emission layer configured to emit the incident light.

According to an exemplary embodiment of the present invention, a color filter includes a substrate including a first pixel area and a second pixel area and a light blocking area positioned between the first and second pixel areas. The light blocking area includes a recessed region. The color filter further includes a first color converting layer including a first plurality of quantum dots and disposed on the first pixel area, a second color converting layer including a second plurality of quantum dots and disposed on the second pixel area, and a light blocker disposed in the recessed region. The light blocker is partially overlapped by the first color converting layer and second color converting layer.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION OF THE EMBODIMENTS

Figure 1:
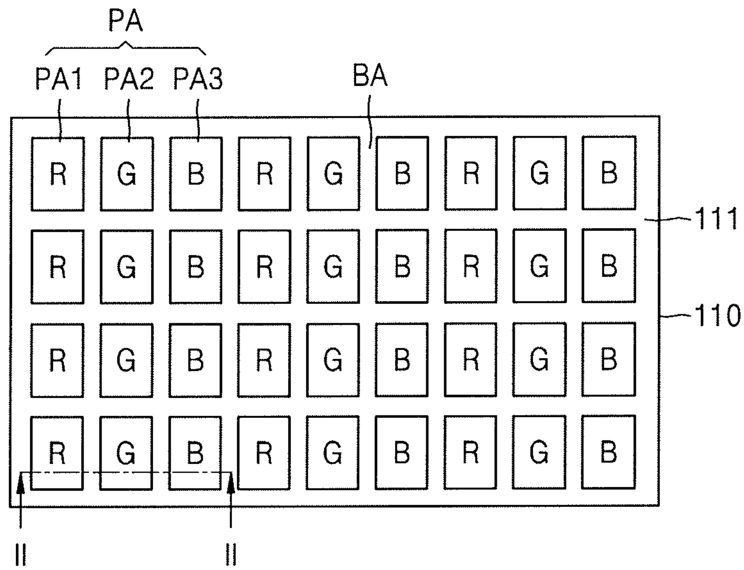
FIG. 1 is a top view of a color filter according to an exemplary embodiment of the present invention.

Exemplary embodiments of the present invention will be described more fully hereinafter with reference to the accompanying drawings. It is to be understood that the present invention may, however, be embodied in different forms and thus should not be construed as being limited to the exemplary embodiments set forth herein. In the figures, like reference numerals may refer to like elements, and thus repetitive descriptions may be omitted.

It will be understood that when a layer, region, or component is referred to as being "on" another layer, region, or component, it can be directly formed on the other layer, region, or component or intervening layers, regions or components may be present. In the drawings, sizes of elements in the drawings may be exaggerated for clarity.

It will be understood that when an element is referred to as being "connected" or "coupled" to another element, the element may be directly connected or coupled to the other element or intervening elements may be present.

As used herein, the singular forms "a," "an" and "the" are intended to include the plural forms as well, unless the context clearly indicates otherwise.

Figure 2:
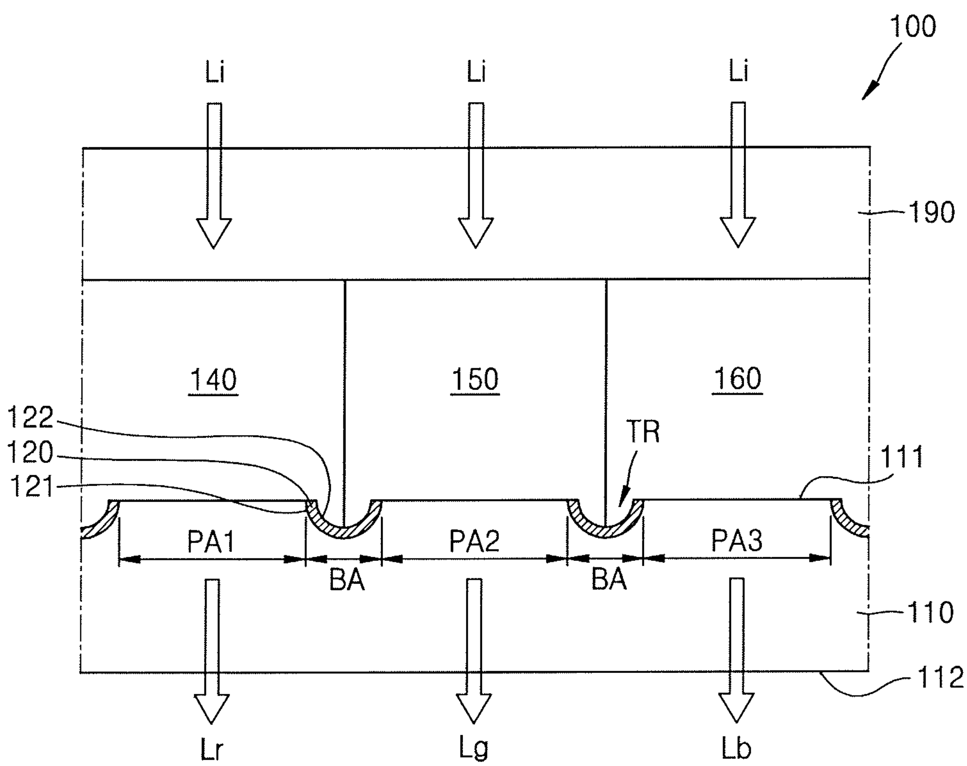
FIG. 2 is a cross-sectional view of the color filter taken along a line II-II of FIG. 1 according to an exemplary embodiment of the present invention.
Figure 3:
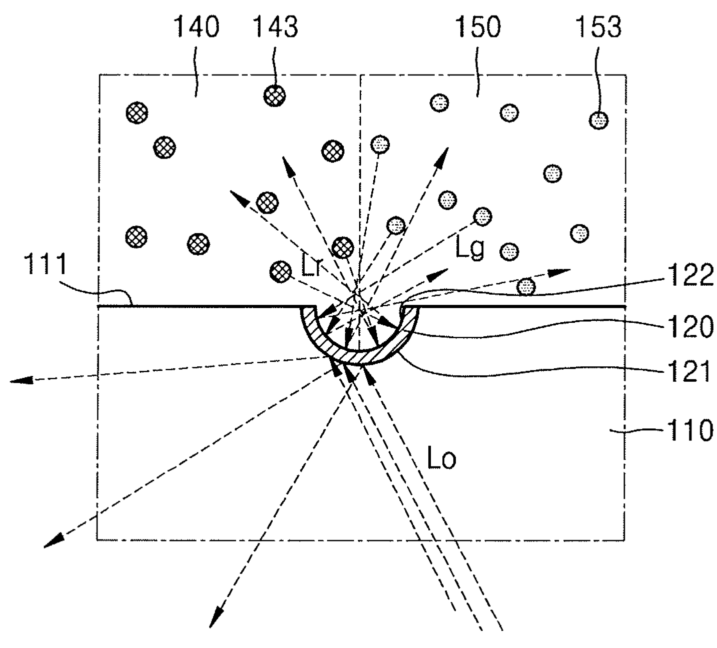
FIG. 3 is a magnified view of a portion of FIG. 2 according to an exemplary embodiment of the present invention.

FIG. 1 is a top view of a color filter 100 according to an exemplary embodiment of the present invention. FIG. 2 is a cross-sectional view of the color filter 100 taken along a line II-II of FIG. 1 according to an exemplary embodiment of the present invention. FIG. 3 is a magnified view of a portion of FIG. 2 according to an exemplary embodiment of the present invention.

Referring to FIGS. 1, 2, and 3, the color filter 100 includes a substrate 110, a first color converter 140, a second color converter 150, and a light blocker 120. The substrate 110 includes a first surface 111 having a first pixel area PA1 and a second pixel area PA2 that are spaced apart from each other, and a trench TR (e.g., a recessed region) formed in a light blocking area BA between the first pixel area PA1 and the second pixel area PA2. The first color converter 140 is disposed on the first pixel area PA1 and converts incident light Li into light Lr of a first color corresponding to the first color converter 140. The second color converter 150 is disposed on the second pixel area PA2 and converts the incident light Li into light Lg of a second color corresponding to the second color converter 150. The light blocker 120 is disposed on the inner wall (e.g., an inner surface) of the trench TR.

The color filter 100 may further include a light emitter 160 that is disposed on a third pixel area PA3 and emits light Lb of a third color. The color filter 100 may further include a planarizing layer 190 covering the first and second color converters 140 and 150 and the light emitter 160.

Referring to FIG. 1 showing the first surface 111 of the substrate 110, a pixel area PA and the light blocking area BA are provided on the first surface 111 of the substrate 110. The pixel area PA is an area from which light is emitted and is at least partially surrounded by the light blocking area BA. The pixel area PA may be divided into the first pixel area PA1, the second pixel area PA2, and the third pixel area PA3 based on a color emitted from each area. For example, the first pixel area PA1 may be an area from which red light is emitted, the second pixel area PA2 may be an area from which green light is emitted, and the third pixel area PA3 may be an area from which blue light is emitted. However, this is merely an example, and exemplary embodiments of the present invention are not limited thereto. The first through third pixel areas PA1, PA2, and PA3 may be arranged in a matrix-like shape.

The light blocking area BA is an area from which no light is emitted and may be disposed to have a mesh-like shape between the first through third pixel areas PA1, PA2, and PA3. When light is emitted from the light-light blocking area BA, light leakage may occur in a display apparatus.

The substrate 110 is a transparent substrate through which light Lr of a first color emitted from the first color converter 140, light Lg of the second color emitted from the second color converter 150, and light Lb of the third color emitted from the light emitter 160 may be transmitted. The substrate 110 may be, for example, an inorganic material transparent substrate including glass or quartz, a plastic transparent substrate including polyethylene terephthalate, polyethylene naphthalate, polyimide, polycarbazole, or the like, or one of various transparent films. However, exemplary embodiments of the present invention are not limited thereto.

The substrate 110 has the first surface 111, on which the first through third pixel areas PA1, PA2 and PA3 and the light blocking area BA provided therebetween are provided, and a second surface 112 on the opposite side of the first surface 111. The second surface 112 is a surface from which the light Lr, Lg, and Lb of first through third colors are emitted. The substrate 110 may have the trench TR formed in the light blocking area BA of the first surface 111. The trench TR may extend from the first surface 111 toward the second surface 112 of the substrate 110. For example, the trench TR may be concave with respect to the first surface 111 of the substrate 110.

The trench TR may have a round (e.g., or a semicircular shape) cross-section as shown in FIG. 2. For example, the trench TR may have a rounded inner wall and a first surface that is convex toward the second surface 112 of the substrate 110 and corresponds to the inner wall. The trench TR having a round cross-section may be formed via anisotropic etching, e.g., wet etching. For example, to form a trench TR having a semicircular cross-section, wet etching may be performed with a stirred wet etching solution. To form the trench TR having a round cross-section, wet etching may be performed without stirring wet etching.

The light blocker 120 may be disposed on the inner wall of the trench TR. The light blocker 120 may be disposed as a thin-film on the inner wall of the trench TR. For example, the light blocker 120 may have a half-pipe-like shape as shown in FIGS. 2 and 3. The light blocker 120 may have a convex first surface 121 contacting the inner wall of the trench TR and a concave second surface 122 that is opposite to the first surface 121. The first surface 121 may have a convex shape facing toward the second surface 112 of the substrate 110 in correspondence to the round inner wall of the trench TR. The second surface 122 of the light blocker 120 is concave with respect to the first surface 111 of the substrate 110.

The light blocker 120 blocks the incident light Li from being emitted to the substrate 110 and prevents the light Lr of the first color emitted from the first color converter 140 from being irradiated to the second color converter 140. Further, the light blocker 120 prevents the light Lg of the second color emitted from the second color converter 150 from being irradiated to the first color converter 140 or the light emitter 160, and prevents the light Lb of the third color emitted from the light emitter 160 from being irradiated to the first color converter 140 or the second color converter 150.

The light blocker 120 may include a metal layer having a high reflectivity. The metal layer may be a layer including silver (Ag), magnesium (Mg), aluminum (Al), platinum (Pt), palladium (Pd), gold (Au), nickel (Ni), neodymium (Nd), iridium (Ir), alloys thereof, or compounds thereof. For example, the light blocker 120 may include a layer including silver (Ag). The light blocker 120 may have a multilayered structure in which a plurality of layers is successively stacked or may be a single structure layer. At least one of the successively stacked layers may be a metal layer. For example, the light blocker 120 may include a transparent metal oxide layer, such as an Indium tin oxide (ITO) layer, and a silver (Ag) layer. For example, the light blocker 120 may include a first transparent metal oxide layer, a silver (Ag) layer, and a second transparent metal oxide layer that are successively stacked on each other.

The light blocker 120 may have a multilayered structure including a first layer that may constitute the first surface 121 and a second layer that may constitute the second surface 122. The first layer constituting the first surface 121 may include an organic material capable of blocking light by absorbing external light. The second layer constituting the second surface 122 may include a metal or a metal oxide with high reflectivity, such that the light Lr, Lg, and Lb of first through third colors emitted from the first and second color converters 140 and 150 and the light emitter 160 are recursively reflected for increased light efficiency. In an example, the first layer may constitute the first surface 121 and may include a material with a high reflectivity. The second layer may constitute the second surface 122 and may include a material that absorbs the light Lr, Lg, and Lb of first through third colors.

The first color converter 140 is disposed on the first pixel area PA1, converts the incident light Li into the light Lr of the first color corresponding to the first color converter 140, and emits the light Lr of the first color toward the substrate 110. The second color converter 150 is disposed on the second pixel area PA2, converts the incident light Li into the light Lg of the second color corresponding to the second color converter 150, and emits the light Lg of the second color toward the substrate 110. The light emitter 160 is disposed on the third pixel area PA3 and emits the light Lb of the third color toward the substrate 110.

According to an exemplary embodiment of the present invention, the incident light Li may be blue light. The light Lr of the first color may be red light. The light Lg of the second color may be green light. The light Lb of the third color may be blue light of the same color as the incident light Li. In this case, the light emitter 160 may transmit the incident light Li therethrough, and may be referred to as a light transmitter or a light transmitting layer. Red light is light having a peak wavelength equal to or greater than about 580 nm and less than about 750 nm. Green light is light having a peak wavelength equal to or greater than about 495 nm and less than about 580 nm. Blue light is light having a peak wavelength equal to or greater than about 400 nm and less than about 495 nm.

According to an example, the incident light Li may be ultraviolet light. Ultraviolet light is light having a peak length equal to or greater than about 200 nm and less than about 400 nm. The light Lr of the first color may be red light. The light Lg of the second color may be green light. The light Lb of the third color may be blue light. In this case, the light emitter 160 may convert the incident light Li into the light Lb of the third color, may emit the light Lb of the third color, and may be referred to as a third light converter.

The planarizing layer 190 may be disposed on the substrate 110 to cover the first color converter 140, the second color converter 150, and the light emitter 160. The planarizing layer 190 may be transparent, such that the incident light Li may be irradiated through the planarizing layer 190 to the first and second color converters 140 and 150 and the light emitter 160. The planarizing layer 190 may include a transparent organic material, such as polyimide resin, acrylic resin, and a resist material. The planarizing layer 190 may be disposed in a wet process, such as a slit coating process or a spin coating process, or a dry process, such as a chemical vapor deposition process or a vacuum deposition process. However, the present exemplary embodiment of the present invention is not limited to the aforementioned materials and the techniques.

FIG. 3 is a magnified view of the light blocker 120 disposed between the first color converter 140 and the second color converter 150.

The first color converter 140 may include first quantum dots 143 that are excited by the incident light Li and emit the light Lr of the first color of a wavelength longer than the wavelength of the incident light Li. The second color converter 150 may include second quantum dots 153 that are excited by the incident light Li and emit the light Lg of the second color of a wavelength longer than the wavelength of the incident light Li.

The first and second quantum dots 143 and 153 include any one from among silicon (Si) based nanocrystals, group II-VI compound semiconductor nanocrystals, group III-V compound semiconductor nanocrystals, group IV-VI compound semiconductor nanocrystals, and mixtures thereof. The group II-VI compound semiconductor nanocrystals may be selected from among, for example, CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, and HgZnSTe. The group III-V compound semiconductor nanocrystals may be selected from among, for example, GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. The group IV-VI compound semiconductor nanocrystals may be SbTe.

The first and second quantum dots 143 and 153 may include a same material. However, the size of the second quantum dots 153 may be different from the size of the first quantum dots 143. As the wavelength of emitted light becomes longer, sizes of the quantum dots 143 and 153 may increase to sufficiently induce surface plasmon resonance. For example, since the wavelength of the light Lg of the second color, e.g., the green light, is shorter than the wavelength of the light Lr of the first color, e.g., the red light, the size of the second quantum dots 153 may be smaller than that of the first quantum dots 143.

The light Lr of the first color and the light Lg of the second color emitted from the first and second quantum dots 143 and 153, respectively, are irradiated isotropically. Therefore, the light Lr of the first color and the light Lg of the second color are not irradiated toward the substrate 110, but may be irradiated uniformly in all directions. As shown in FIG. 3, the light Lr of the first color emitted from the first quantum dots 143 is reflected by the second surface 122 of the light blocker 120 and returns to the first color converter 140. The light Lg of the second color emitted from the second quantum dots 153 is reflected by the second surface 122 of the light blocker 120 and returns to the second color converter 150. Therefore, the amount of the light Lr of the first color emitted from the first color converter 140 through the first pixel area PA1 increases, and the amount of the light Lg of the second color emitted from the second color converter 150 through the second pixel area PA2 increases. As a result, the light efficiency may be increased.

Furthermore, as the light Lr of the first color emitted from the first quantum dots 143 is reflected by the concave second surface 122 of the light blocker 120 and returns to the first color converter 140 and the light Lg of the second color emitted from the second quantum dots 153 is reflected by the concave second surface 122 of the light blocker 120 and returns to the second color converter 150, the light Lr of the first color may be prevented from being emitted to the second color converter 150 and the light Lg of the second color may be prevented from being emitted to the first color converter 140. As a result, only the light Lr of the first color is emitted through the first pixel area PA1 and only the light Lg of the second color is emitted through the second pixel area PA2. In other words, color reproducibility may be increased.

In addition, outside light Lo is reflected by the convex first surface 121 of the light blocker 120. Since the first surface 121 is convex toward the second surface 112 of the substrate 110, the outside light Lo reflected by the first surface 121 is widely dispersed. For example, the outside light Lo incident to the convex first surface 121 may be irregularly reflected in a direction away from the first surface 111 of the substrate 110. Therefore, the amount of the outside light Lo, which is reflected by the light blocker 120 and irradiated to eyes of a viewer, may be reduced, and thus, reduction of the color reproducibility due to the outside light Lo may be suppressed.

Figure 4A:
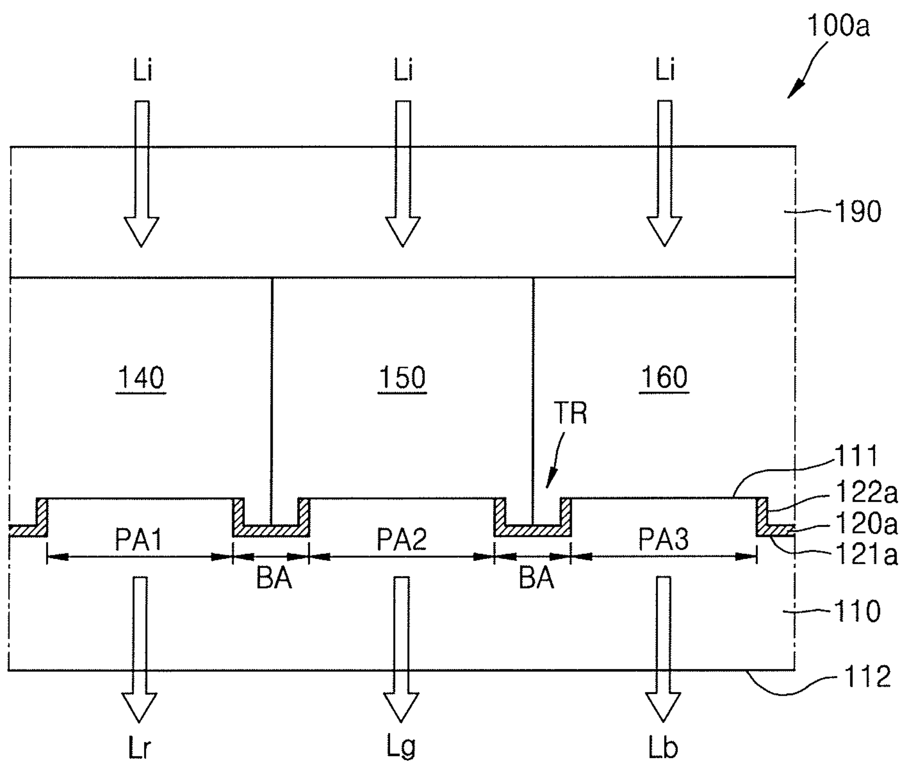
FIG. 4A is a cross-sectional view of a color filter according to an exemplary embodiment of the present invention.

FIG. 4A is a cross-sectional view of a color filter 100*a* according to an exemplary embodiment of the present invention.

Referring to FIG. 4A, the color filter 100*a* includes the substrate 110, a light blocker 120*a*, the first color converter 140, the second color converter 150, the light emitter 160, and the planarizing layer 190. The substrate 110, the first color converter 140, the second color converter 150, the light emitter 160, and the planarizing layer 190 are described above with reference to FIGS. 1 through 3, and thus, detailed description thereof might not be repeated and descriptions below may focus on differences between the color filter 100 illustrated in FIG. 2 and the color filter 100*a* illustrated in FIG. 4A.

The trench TR is provided in the light blocking area BA of the first surface 111 of the substrate 110. The cross-section of the trench TR may have a substantially constant width throughout the trench TR in the depth-wise direction. In other words, the depth of the trench TR is substantially constant across a base of the trench TR. The trench TR may be formed via anisotropic etching, e.g., dry etching. Due to fabrication errors, sidewalls of the trench TR might not be exactly perpendicular to the substrate 110 and may be inclined. For example, the distance between the sidewalls of the trench TR may decrease throughout the trench TR in the depth-wise direction. Although FIG. 4A shows that the lower corner of the trench TR is a right angle, the lower corner of the trench TR may have a rounded shape depending on fabrication processes. The depth-wise direction refers to a direction from the first surface 111 toward the second surface 112 of the substrate 110.

The light blocker 120*a* may be a thin-film disposed on the inner wall of the trench TR. The light blocker 120*a* may have a first surface 121*a* contacting the inner wall of the trench TR. The first surface 121*a* may have a rectangular shape corresponding to the inner wall of the trench TR. The light blocker 120*a* may have a second surface 122*a* opposite to the first surface 121*a*. The second surface 122*a* may be concave and may have a rectangular shape in correspondence to the inner wall of the trench TR. According to an exemplary embodiment of the present invention, the light blocker 120*a* may completely fill the trench TR and have a flat second surface.

The light Lr, Lg, and Lb of the first through third colors emitted from the first color converter 140, the second color converter 150, and the light-emitter 160, respectively, are recursively reflected by the concave second surface 122*a* of the light blocker 120*a*, and thus, the light efficiency may be increased.

Figure 4B:
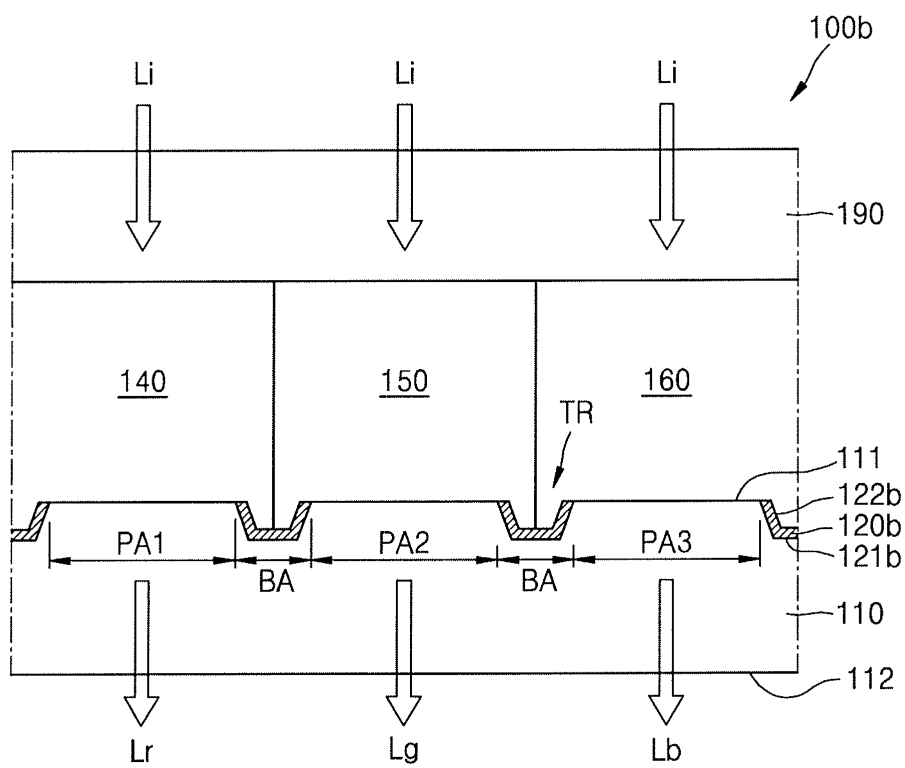
FIG. 4B is a cross-sectional view of a color filter according to an exemplary embodiment of the present invention.

FIG. 4B is a cross-sectional view of a color filter 100*b* according to an exemplary embodiment of the present invention.

Referring to FIG. 4B, the color filter 100*b* includes the substrate 110, a light blocker 120*b*, the first color converter 140, the second color converter 150, the light emitter 160, and the planarizing layer 190. The substrate 110, the first color converter 140, the second color converter 150, the light-emitter 160, and the planarizing layer 190 are described above with reference to FIGS. 1 through 3, and thus, detailed descriptions thereof might not be repeated and descriptions below will focus on differences between the color filter 100 illustrated in FIG. 2 and the color filter 100*b*.

The trench TR is provided in the light blocking area BA of the first surface 111 of the substrate 110. The cross-section of the trench TR may have a width that decreases substantially in the depth direction. For example, the width decreases from a side of the trench TR to a center of the trench TR. In other words, an angle formed between a sidewall of the trench TR and the bottom surface of the trench TR (e.g., a lower corner of the trench TR) may form an obtuse angle. The trenches TR may be formed by a combination of anisotropic etching, e.g., dry etching, and isotropic etching, e.g., wet etching. The trench TR may be formed by anisotropic inclined etching. Although the lower corner of the trench TR is an obtuse angle in FIG. 4B, the lower corner of the trench TR may have a rounded shape according to fabrication processes. The depth-wise direction refers to a direction from the first surface 111 toward the second surface 112 of the substrate 110.

The light blocker 120*b* may be a thin-film disposed on the inner wall of the trench TR. The light blocker 120*b* may have a first surface 121*b* that contacts the inner wall of the trench TR and is convex toward the second surface 112 of the substrate 110. The first surface 121*b* may have a trapezoidal shape with the width decreasing in the depth-wise direction in correspondence to the inner wall of the trench TR. The light blocker 120*b* may have a second surface 122*b* opposite to the first surface 121*b*. The second surface 122*a* may be concave with respect to the first surface 111 of the substrate 110 and may be in correspondence to the inner wall of the trench TR. According to an exemplary embodiment of the present invention, the light blocker 120*b* may completely fill the trench TR and have a flat second surface that would face the bottom surface of the trench TR.

The light Lr, Lg, and Lb of the first through third colors emitted from the first color converter 140, the second color converter 150, and the light-emitter 160 are recursively reflected by the concave second surface 122*b* of the light blocker 120*b*, and thus, the light efficiency may be increased.

Figure 5A:
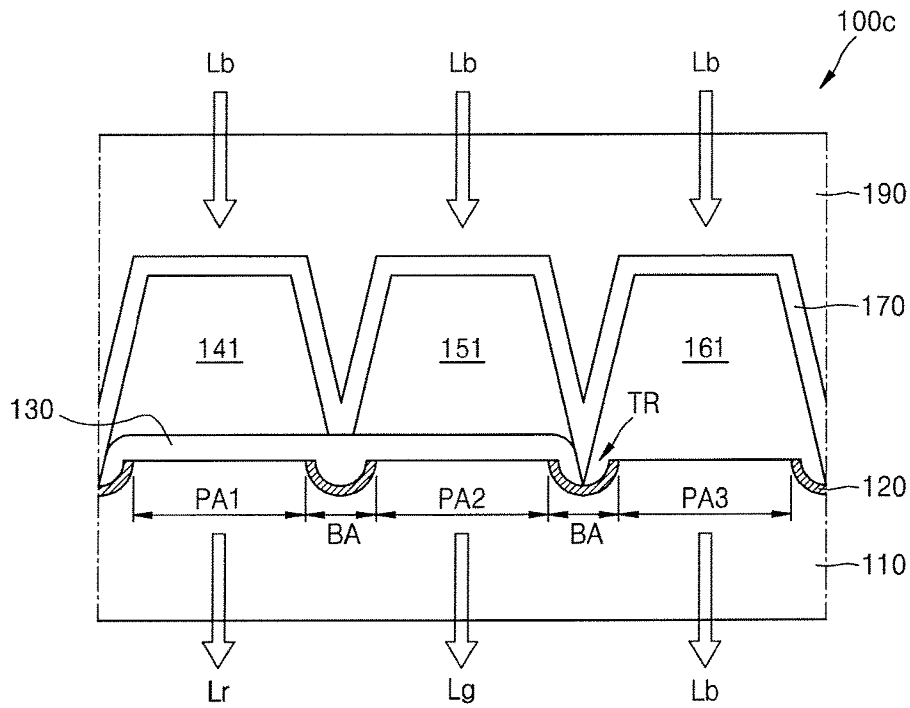
FIG. 5A is a cross-sectional view of a color filter according to an exemplary embodiment of the present invention.
Figure 5B:
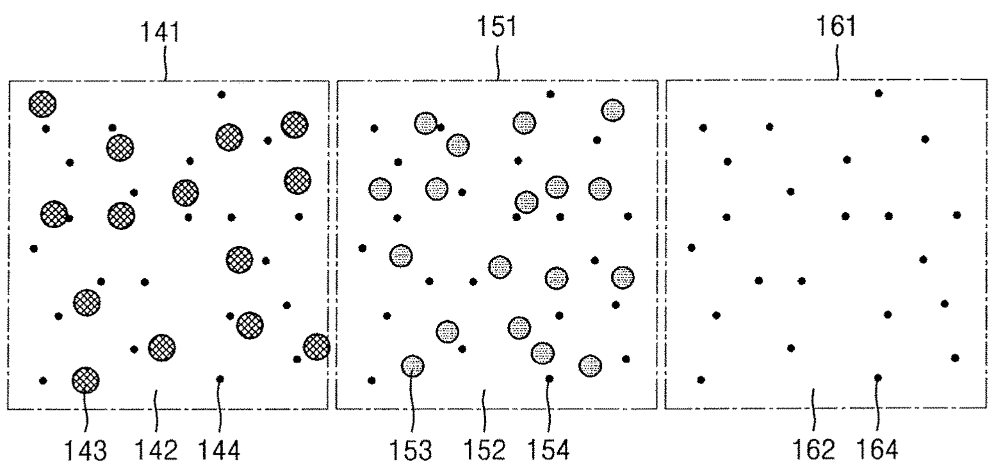
FIG. 5B is a magnified view of a first color converting layer, a second color converting layer, and a light transmitting layer of FIG. 5A according to an exemplary embodiment of the present invention.

FIG. 5A is a cross-sectional view of a color filter 100*c* according to an exemplary embodiment of the present invention. FIG. 5B is a magnified view of a first color converting layer 141, a second color converting layer 151, and a light transmitting layer 161 of FIG. 5A according to an exemplary embodiment of the present invention.

Referring to FIGS. 5A and 5B, the color filter 100*c* includes the substrate 110, the light blocker 120, a color filter layer 130, the first color converting layer 141, the second color converting layer 151, the light transmitting layer 161, a band pass filter layer 170, and the planarizing layer 190.

The substrate 110, the light blocker 120, and the planarizing layer 190 are described above with reference to FIGS. 1 through 3, and thus, detailed descriptions thereof might not be repeated and descriptions below may focus on differences between the color filter 100 and the color filter 100*c*. The light blocker 120 may be replaced with the light blocker 120*a* or the light blocker 120*b* shown in FIGS. 4A and 4B, respectively. The first color converting layer 141, the second color converting layer 151, and the light transmitting layer 161 correspond to the first color converter 140, the second color converter 150, and the light-emitter 160, respectively. For example, the first color converter 140, the second color converter 150, and the light-emitter 160 may include the first color converting layer 141, the second color converting layer 151, and the light transmitting layer 161, respectively.

In the present exemplary embodiment, the incident light Li incident to the first and second color converting layers 141 and 151 and the light transmitting layer 161 may be blue light Lb. The first color converting layer 141 may convert the incident blue light Lb into the light Lr of the first color, e.g., red light Lr, and emit the red light Lr, the second color converting layer 151 may convert the incident blue light Lb into the light Lg of the second color, e.g., green light Lg, and emits the green light Lg, and the light transmitting layer 161 may emit the incident blue light Lb toward the substrate 110.

The color filter layer 130 is disposed on the first pixel area PA1 and the second pixel area PA2 and reflects the incident light Lb to the first color converting layer 141 and the second color converting layer 151, such that the incident light Lb is not emitted toward the substrate 110. By reflecting the incident light Lb toward the first and second quantum dots 143 and 153 in the first color converting layer 141 and the second color converting layer 151 to excite the first and second quantum dots 143 and 153, a color conversion rate regarding the incident light Lb may increase and the blue incident light Lb may be prevented from being emitted via the first pixel area PA1 and the second pixel area PA2 for improved color reproducibility.

The color filter layer 130 may be a blue light Lb reflecting filter for reflecting the blue incident light Lb or a blue light Lb blocking filter.

Although FIG. 5A shows that the color filter layer 130 is continuously disposed on the first pixel area PA1 and the second pixel area PA2, portions of the color filter layer 130 may be disposed apart from each other on the first pixel area PA1 and the second pixel area PA2. The color filter layer 130 disposed on the first pixel area PA1 may be a red light Lr transmitting filter for selectively transmitting the red light Lr. The red light Lr transmitting filter may reflect the blue light Lb and may block green light Lg that may be included in the incident light Lb. In this case, the green light Lg that may be emitted from the adjacent second color converting layer 151 toward the first color converting layer 141. The color filter layer 130 disposed on the second pixel area PA2 may be a green light Lg transmitting filter for selectively transmitting the green light Lg. The green light Lg transmitting filter may reflect the blue light Lb and may reflect red light Lr that may be included in the incident light Lb. In this case, the red light Lr that may be emitted from the adjacent first color converting layer 141 toward the second color converting layer 151.

The first color converting layer 141 may include a photosensitive resin 142 disposed on the first pixel area PA1 and having the first quantum dots 143 and diffusing particles 144 dispersed in the photosensitive resin 142. The photosensitive resin 142 may be a phototransmissive organic material, such as silicon resin or epoxy resin.

The first quantum dots 143 are excited by the blue incident light Lb and emit the red light Lr. The first quantum dots 143 may absorb the incident light Lb and emit the red light Lr of a wavelength longer than the wavelength of the incident light Lb. The diffusing particles 144 diffuse the incident light Lb not absorbed by the first quantum dots 143 and cause more of the first quantum dots 143 to be excited so that the color conversion rate of the first color converting layer 141 may be increased.

The second color converting layer 151 may include a photosensitive resin 152 disposed on the second pixel area PA2 and having the second quantum dots 153 and diffusing particles 154 dispersed in the photosensitive resin. The photosensitive resin 152 may be a phototransmissive organic material, such as silicon resin or epoxy resin.

The second quantum dots 153 are excited by blue incident light Lb to emit green light Lg. The second quantum dots 153 may absorb the incident light Lb and emit the green light Lg of a wavelength longer than the wavelength of the incident light Lb. The diffusing particles 154 diffuse the incident light Lb not absorbed by the second quantum dots 153 and cause more of the second quantum dots 153 to be excited so that the color conversion rate of the second color converting layer 151 may be increased.

The light transmitting layer 161 may include a photosensitive resin 162 disposed on the third pixel area PA3 and having diffusing particles 164 dispersed in the photosensitive resin 162. The photosensitive resin 162 may be a phototransmissive organic material, such as silicon resin or epoxy resin. The diffusing particles 164 may diffuse and emit the incident light Lb.

The first and second quantum dots 143 and 153 may include any one from among silicon (Si) based nanocrystals, group 11-VI compound semiconductor nanocrystals, group III-V compound semiconductor nanocrystals, group IV-VI compound semiconductor nanocrystals, and mixtures thereof.

The diffusing particles 144, 154, and 164 may include a same material. The diffusing particles 144, 154, and 164 may be, for example, titanium oxide ($TiO_2$) particles or metal particles. However, the diffusing particles 144, 154, 164 are not limited to the aforementioned materials. The photosensitive resins 142, 152, and 162 may include a same material.

The first and second quantum dots 143 and 153 may include a same material. However, the sizes of the first and second quantum dots 143 and 153 may be different from each other. As the wavelength of emitted light becomes longer, sizes of the quantum dots 143 and 153 tend to increase to sufficiently induce surface plasmon resonance. Therefore, since the wavelength of green light Lg is shorter than the wavelength of red light Lr, the size of the second quantum dots 153 may be smaller than that of the first quantum dots 143. Furthermore, the sizes of the diffusing particles 144, 154, and 164 may be smaller than the size of the second quantum dots 153.

According to an exemplary embodiment of the present invention, the first color converting layer 141 may include a phosphor that converts the incident light Lb into the red light Lr, and the second color converting layer 151 may include a phosphor that converts the incident light Lb into the green light Lg.

The band pass filter layer 170 may be disposed on the first and second color converting layers 141 and 151 and the light transmitting layer 161, may selectively transmit the incident light Lb therethrough, and reflect the red light Lr and the green light Lg emitted from the first and second converting layers 141 and 151, such that the red light Lr and the green light Lg are emitted toward the substrate 110.

When the red light Lr or the green light Lg is included in the incident light Lb, the green light Lg might not be able to excite the first quantum dots 143 in the first color converting layer 141 and may be emitted to the outside through the first pixel area PA1, whereas the light Lr of the first color might not be able to excite the second quantum dots 153 in the second color converting layer 151 and may be emitted to the outside through the second pixel area PA2. In this case, not only the red light Lr, but also the green light Lg is emitted from the first pixel area PA1. Further in this case, not only the green light Lg, but also the red light Lr is emitted from the second pixel area PA2. Therefore, color purity may deteriorate and color reproducibility may be reduced. The band pass filter layer 170 may selectively transmit only the incident light Lb therethrough to increase color purity and color reproducibility. According to an example, the band pass filter layer 170 may be omitted.

Figure 6A:
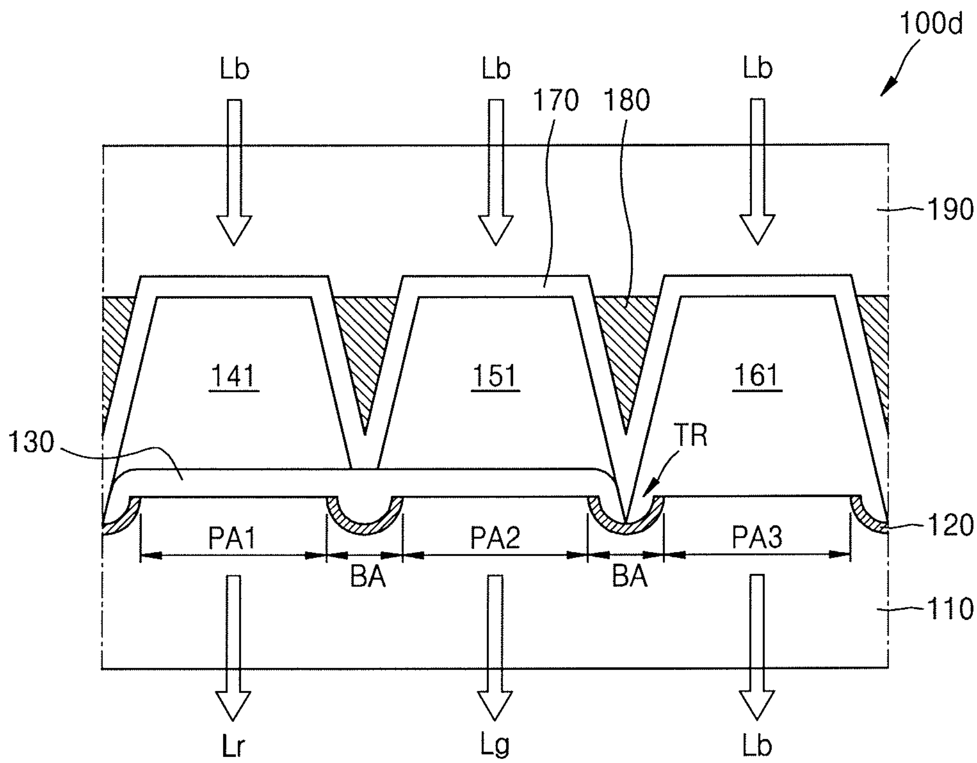
FIG. 6A is a cross-sectional view of a color filter according to an exemplary embodiment of the present invention.

FIG. 6A is a cross-sectional view of a color filter 100*d* according to an exemplary embodiment of the present invention.

Referring to FIG. 6A, the color filter 100*d* includes the substrate 110, the light blocker 120, the color filter layer 130, the first color converting layer 141, the second color converting layer 151, the light-transmitting layer 161, the band-pass filter layer 170, a light-blocking sidewall 180, and the planarizing layer 190.

The substrate 110, the light blocker 120, the color filter layer 130, the first color converting layer 141, the second color converting layer 151, the light transmitting layer 161, the band pass filter layer 170, and the planarizing layer 190 are described above with reference to FIGS. 5A through 5B, and thus, detailed descriptions thereof might not be repeated and descriptions below may focus on differences between the color filter 100*c* illustrated in FIG. 5A and the color filter 100*d*.

The light-blocking sidewall 180 is disposed on a portion of the band pass filter layer 170 to surround at least portions of the sidewalls of the first and second color converting layers 151 and 161. For example, the light-blocking sidewall 180 may be disposed between the first converting layer 141, the second color converting layer 151, and the light transmitting layer 161. The light-blocking sidewall 180 may be disposed above the light blocker 120. The light-blocking sidewall 180 may correspond to (e.g., be substantially aligned with) the light blocker 120 and may have a mesh-like shape when viewed from above.

The light-blocking sidewall 180 may include an organic material that blocks the light Lr, Lg, and Lb emitted from the first color converting layer 141, the second color converting layer 151, and the light transmitting layer 161, respectively. The light-blocking sidewall 180 may include a material that reflects the light Lr, Lg, and Lb.

The light-blocking sidewall 180 may prevent red light Lr emitted in a lateral direction from the first color converting layer 141 from being incident to the second color converting layer 151 and the light transmitting layer 161. The light-blocking sidewall 180 may prevent green light Lg emitted in a lateral direction from the second color converting layer 151 from being incident to the first color converting layer 141 and the light transmitting layer 161. The light-blocking sidewall 180 may prevent blue light Lb emitted in a lateral direction from the light transmitting layer 141 from being incident to the first and second color converting layers 141 and 151. Therefore, the light-blocking sidewall 180 may prevent color mixture, and color purity and color reproducibility may be increased.

Figure 6B:
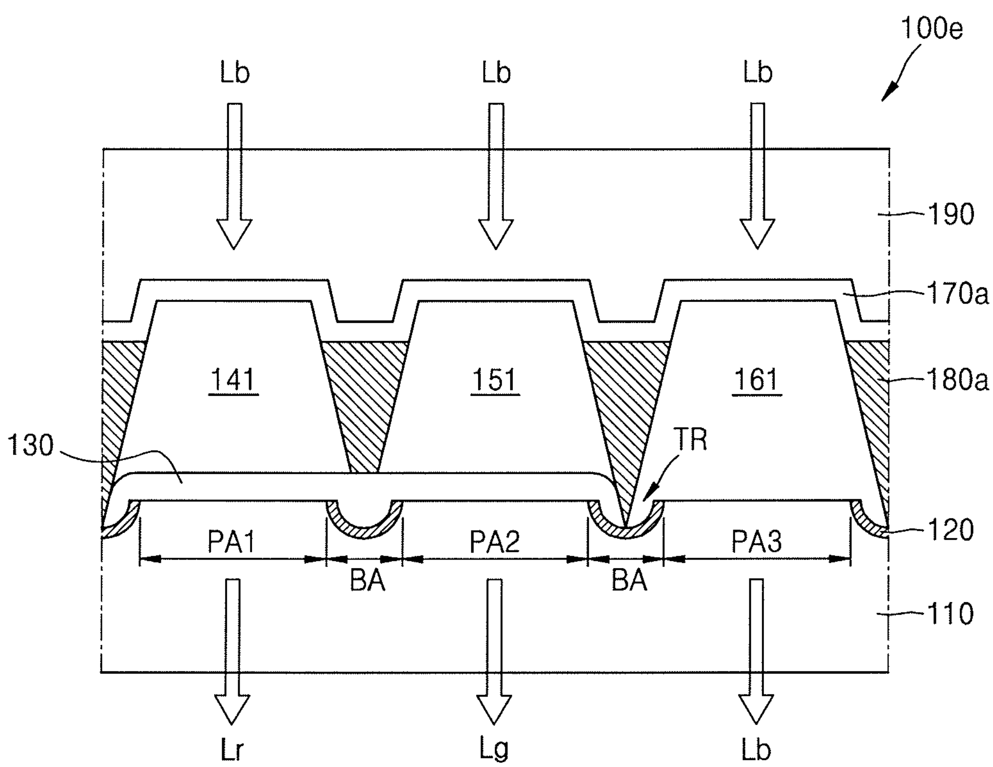
FIG. 6B is a cross-sectional view of a color filter according to an exemplary embodiment of the present invention.

FIG. 6B is a cross-sectional view of a color filter 100*e* according to an exemplary embodiment of the present invention.

Referring to FIG. 6B, the color filter 100*e* includes the substrate 110, the light blocker 120, the color filter layer 130, the first color converting layer 141, the second color converting layer 151, the light transmitting layer 161, the band pass filter layer 170*a*, a light-blocking sidewall 180*a*, and the planarizing layer 190.

The substrate 110, the light blocker 120, the color filter layer 130, the first color converting layer 141, the second color converting layer 151, the light transmitting layer 161, and the planarizing layer 190 are described above with reference to FIGS. 5A through 5B, and thus, detailed descriptions thereof might not be repeated and descriptions below may focus on differences between the color filter 100*c* illustrated in FIG. 5A and the color filter 100*e*.

The light-blocking sidewall 180*a* may surround at least portions of the sidewalls of the first and second color converting layers 151 and 161. The light-blocking sidewall 180*a* may be disposed above the light blocker 120. The light-blocking sidewall 180*a* corresponds to the light blocker 120 and may have a mesh-like shape when viewed from above.

The light-blocking sidewall 180*a* may include an organic material which blocks the light Lr, Lg and Lb emitted from the first color converting layer 141, the second color converting layer 151, and the light transmitting layer 161. The light-blocking sidewall 180*a* may include a material that reflects the light Lr, Lg, and Lb. The light-blocking sidewall 180*a* may prevent color mixture, and color purity and color reproducibility may be increased.

The band-pass filter layer 170*a* may be disposed on the first and second color converting layers 141 and 151, the light transmitting layer 161, and the light-blocking sidewall 180*a*, and the band-pass filter layer 170*a* may selectively transmit the incident light Lb therethrough. The band pass filter layer 170*a* may reflect the red light Lr and the green light Lg emitted from the first and second color converting layers 141 and 151, such that the red light Lr and the green light Lg are emitted toward the substrate 110. For example, the red light Lr and green light Lg may be reflected toward the substrate 110. The band pass filter layer 170*a* may selectively transmit only the incident light Lb therethrough to improve color purity and color reproducibility.

Figure 6C:
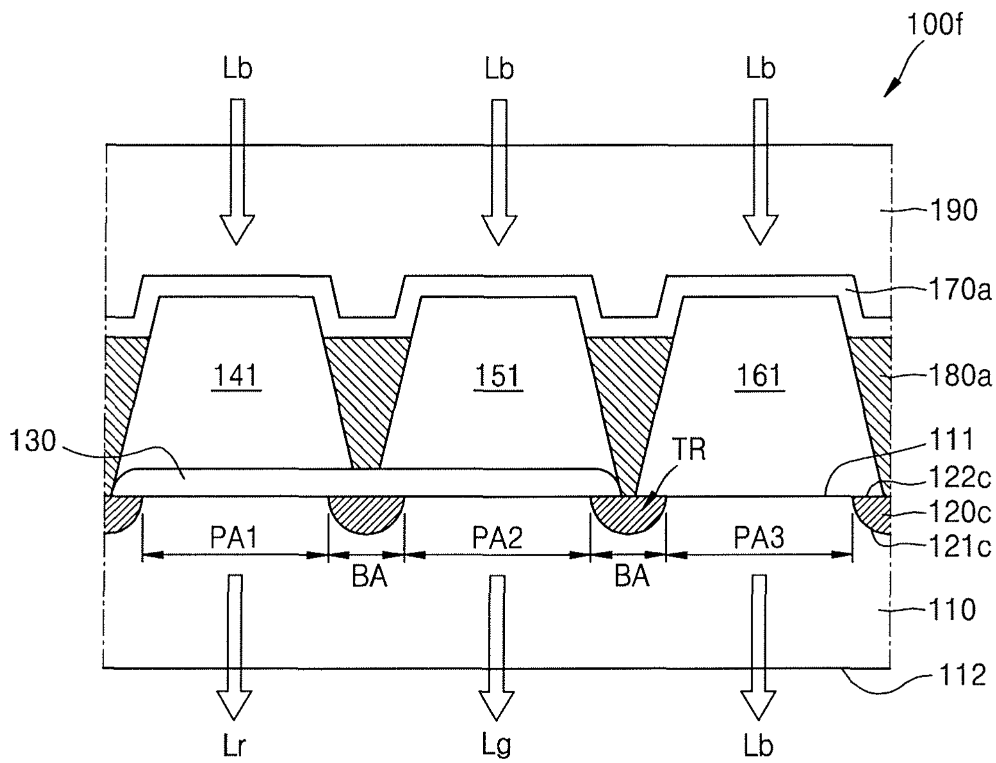
FIG. 6C is a cross-sectional view of a color filter according to an exemplary embodiment of the present invention.

FIG. 6C is a cross-sectional view of a color filter 100*f* according to an exemplary embodiment of the present invention.

Referring to FIG. 6C, the color filter 100*f* includes the substrate 110, a light blocker 120*c*, the color filter layer 130, the first color converting layer 141, the second color converting layer 151, the light transmitting layer 161, the band pass filter layer 170*a*, the light-blocking sidewall 180*a*, and the planarizing layer 190.

Since the color filter 100*f* is substantially identical to the color filter 100*e* shown in FIG. 6B except for the light blocker 120*c*, detailed descriptions of components that may be assumed to be the same or similar to previously described components might not be repeated, and thus, descriptions below may focus on differences between the color filter 100*e* and the color filter 100*f*.

The light blocker 120*c* may completely fill the trench TR provided in the light blocking area BA of the substrate 110. Therefore, the light blocker 120*c* may have the first surface 121*c*, which is in contact with the inner wall of the trench TR and is convex toward the second surface 112 of the substrate 110, and a second surface 122*c*, which is substantially flat. The second surface 122*c* may be substantially flat and may be coplanar with the first surface 111 of the substrate 110. The light blocker 120*c* having the substantially flat second surface 122*c* may be included in the color filters 100 and 100*a* through 100*e* shown in FIGS. 1 through 6B.

Figure 6D:
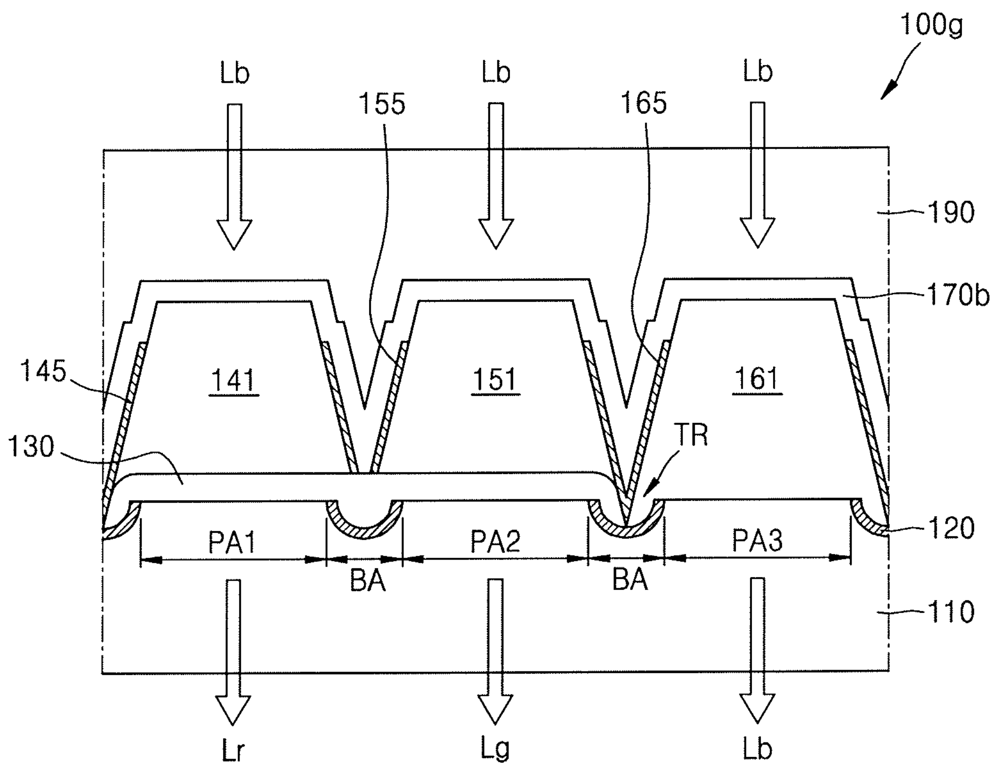
FIG. 6D is a cross-sectional view of a color filter according to an exemplary embodiment of the present invention.

FIG. 6D is a cross-sectional view of a color filter 100*g* according to an exemplary embodiment of the present invention.

Referring to FIG. 6D, the color filter 100*g* includes the substrate 110, the light blocker 120, the color filter layer 130, the first color converting layer 141, the second color converting layer 151, the light transmitting layer 161, first through third light blocking layers 145, 155 and 165, a band pass filter layer 170*b*, and the planarizing layer 190.

The substrate 110, the light blocker 120, the color filter layer 130, the first color converting layer 141, the second color converting layer 151, the light transmitting layer 161, and the planarizing layer 190 are described above with reference to FIGS. 5A through 5B, and thus, detailed descriptions thereof might not be repeated and descriptions below may focus on differences between the color filter 100*c* illustrated in FIG. 5A and the color filter 100*g*.

The band pass filter layer 170*b* may be disposed on the first and second color converting layers 141 and 151 and the light transmitting layer 161, and may selectively transmit the incident light Lb therethrough. The band pass filter layer 170*b* may reflect the red light Lr and the green light Lg emitted from the first and second color converting layers 141 and 151, respectively, such that the red light Lr and the green light Lg are emitted toward the substrate 110. The band pass filter layer 170*b* may selectively transmit only the incident light Lb therethrough to increase color purity and color reproducibility.

The first light-blocking layer 145 may be disposed between the sidewall of the first color converting layer 141 and the band-pass filter layer 170*b*. The first light-blocking layer 145 surrounds at least a portion of the first color converting layer 141. The second light blocking layer 155 may be disposed between the sidewall of the second color converting layer 151 and the band pass filter layer 170*b*. The second color converting layer 151 surrounds at least a portion of the second color converting layer 151. The third light blocking layer 165 may be disposed between the sidewall of the light transmitting layer 161 and the band pass filter layer 170*b*. The light transmitting layer 161 surrounds at least a portion of the light transmitting layer 161.

The first through third light blocking layers 145, 155, and 165 may be disposed above the light blocker 120. The first through third light-blocking layers 145, 155 and 165 correspond to the light blocker 120 and may have a mesh-like shape when viewed from above.

The first through third light-blocking layers 145, 155, and 165 may include a metal for blocking the light Lr, Lg, and Lb emitted from the first color converting layer 141, the second color converting layer 151, and the light transmitting layer 161. The first through third light-blocking layers 145, 155, and 165 may prevent color mixture, and may increase color purity and color reproducibility.

Figure 7A:
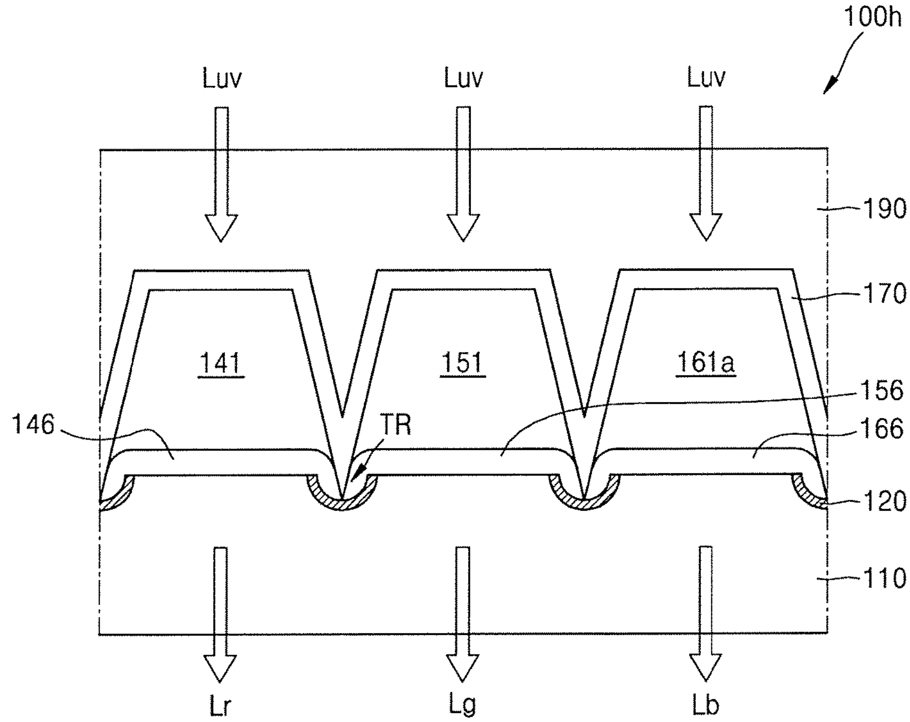
FIG. 7A is a cross-sectional view of a color filter according to an exemplary embodiment of the present invention.
Figure 7B:
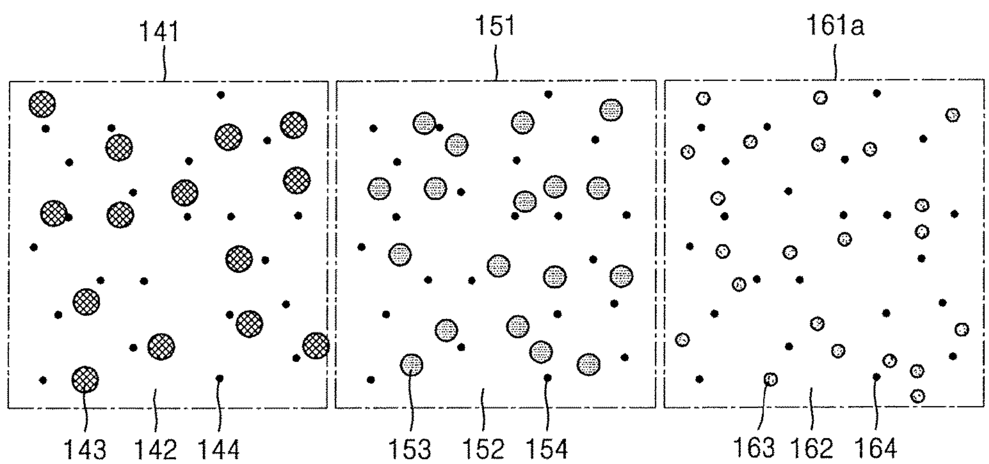
FIG. 7B is a magnified view of a first color converting layer, a second color converting layer, and a third color converting layer in FIG. 7A according to an exemplary embodiment of the present invention.

FIG. 7A is a cross-sectional view of a color filter 100*h* according to an exemplary embodiment of the present invention. FIG. 7B is a magnified view of a first color converting layer 141, a second color converting layer 151, and a third color converting layer 161 in FIG. 7A according to an exemplary embodiment of the present invention.

Referring to FIGS. 7A and 7B, the color filter 100*h* includes the substrate 110, the light blocker 120, the first through third color filter layers 146, 156, and 166, the first color converting layer 141, the second color converting layer 151, a third color converting layer 161*a*, the band pass filter layer 170, and the planarizing layer 190.

The substrate 110, the light blocker 120, the band pass filter layer 170, and the planarizing layer 190 are described above with reference to FIGS. 5A through 5B, and thus, detailed descriptions thereof might not be repeated and descriptions below may focus on differences between the color filter 100*c* illustrated in FIG. 5A and the color filter 100*h*. The light blocker 120 may be replaced with the light blocker 120*a* and the light blocker 120*b* shown in FIGS. 4A and 4B, respectively. The first color converting layer 141, the second color converting layer 151, and the third color converting layer 161*a* may be substantially the same as the first color converter 140, the second color converter 150, and the light emitter 160 shown in FIG. 2, respectively.

In the present exemplary embodiment, the incident light Li incident to the first through third color converting layers 141, 151, and 161*a* may be ultraviolet light and may be referred to as incident light Luv or incident ultraviolet light Luv. The first color converting layer 141 may convert the incident ultraviolet light Luv into light Lr of a first color, e.g., the red light Lr, and emit the red light Lr. The second color converting layer 151 may convert the incident ultraviolet light Luv into light Lg of a second color, e.g., the green light Lg, and emit the green light Lg. The third color converting layer 161*a* may convert the incident ultraviolet light Luv into light Lb of a third color, e.g., the blue light Lb, and emit the blue light Lb.

The first through third color filter layers 146, 156, and 166 are disposed on the first through third pixel areas PA1, PA2, and PA3, respectively. The first through third color filter layers 146, 156 and 166 reflect the incident light Luv toward the first through third color converting layers 141, 151, and 161*a*, such that the incident light Luv is not emitted toward the substrate 110. By reflecting the incident light Luv, more of the first through third quantum dots 143, 153 and 163 in the first through third color converting layers 141, 151 and 161*a*, respectively, are excited. Accordingly, color conversion rate of the incident light Luv may be increased and the ultraviolet light Luv harmful to human body may be prevented from being emitted to the outside. The first through third color filter layers 146, 156, and 166 may be ultraviolet light reflecting filters for reflecting the ultraviolet light Luv or may be ultraviolet light blocking filters.

The first color filter layer 146 in the first pixel area PA1 may be a red light Lr transmitting filter for selectively transmitting the red light Lr. The red light Lr transmitting filter may reflect or absorb the ultraviolet light Luv, the blue light Lb, and the green light Lg. The second color filter layer 156 in the second pixel area PA2 may be a green light Lg transmitting filter for selectively transmitting green light Lg. The green light Lg transmitting filter may reflect or absorb the ultraviolet light Luv, the blue light Lb, and the red light Lr. The third color filter layer 166 on the third pixel area PA3 may be a blue light Lb transmitting filter for selectively transmitting blue light Lb. The blue light Lb transmitting filter may reflect or absorb the ultraviolet light Luv, the green light Lg, and the red light Lr.

The first color converting layer 141 may be disposed in the first pixel area PA1 and may include the photosensitive resin 142 having dispersed therein the first quantum dots 143 and the diffusing particles 144. The first quantum dots 143 are excited by the incident light Luv and emit the red light Lr. The first quantum dots 143 may absorb the incident light Luv and emit the red light Lr with a wavelength longer than the wavelength of the incident light Luv. The diffusing particles 144 diffuse the incident light Luv not absorbed by the first quantum dots 143 and cause more of the first quantum dots 143 to be excited, thereby increasing the color conversion rate of the first color converting layer 141.

The second color converting layer 151 may be disposed in the second pixel area PA2 and may include a photosensitive resin 152 having dispersed therein second quantum dots 153 and the diffusing particles 154. The second quantum dots 153 are excited by the incident light Luv and emit the green light Lg. The second quantum dots 153 may absorb the incident light Luv and emit the green light Lg with a wavelength longer than the wavelength of the incident light Luv. The diffusing particles 154 diffuse the incident light Luv not absorbed by the second quantum dots 153 and cause more of the second quantum dots 153 to be excited, thereby increasing the color conversion rate of the second color converting layer 151.

The third color converting layer 161*a* may be disposed in the third pixel area PA3 and may include the photosensitive resin 162 having dispersed therein the third quantum dots 163 and the diffusing particles 164. The third quantum dots 163 are excited by the incident light Luv and emit blue light Lb. The third quantum dots 163 may absorb the incident light Luv and emit the blue light Lb with a wavelength longer than the wavelength of the incident light Luv. The diffusing particles 164 diffuse the incident light Luv not absorbed by the third quantum dots 163 and cause more of the third quantum dots 163 to be excited, thereby increasing the color conversion rate of the third color converting layer 161*a*.

The photosensitive resins 142, 152, 162 may include a same material. For example, the photosensitive resins 142, 152, 162 may include a phototransmissive organic material, such as silicon resin or epoxy resin.

The diffusing particles 144, 154, and 164 may include a same material. The diffusing particles 144, 154, and 164 may be, for example, titanium oxide ($TiO_2$) particles or metal particles. However, the diffusing particles 144, 154, and 164 are not limited to the aforementioned materials.

The first through third quantum dots 143, 153, and 163 may include any one from among silicon (Si) based nanocrystals, group 11-VI compound semiconductor nanocrystals, group III-V compound semiconductor nanocrystals, group IV-VI compound semiconductor nanocrystals, and mixtures thereof.

The first through third quantum dots 143, 153, and 163 may include a same material. However, the sizes of the first through third quantum dots 143, 153, and 163 may be different from one another. As the wavelength of emitted light becomes longer, sizes of the quantum dots 143, 153, and 163 tend to increase to induce surface plasmon resonance. Therefore, since the wavelength of blue light Lb is shorter than the wavelength of green light Lg and the wavelength of green light Lg is shorter than the wavelength of red light Lr, the size of the third quantum dots 163 may be smaller than that of the second quantum dots 153, and the size of the second quantum dots 153 may be smaller than that of the first quantum dots 143. Furthermore, the sizes of the diffusing particles 144, 154, and 164 may be smaller than the size of the third quantum dots 163.

According to an exemplary embodiment of the present invention, the first color converting layer 141 may include a phosphor that converts the incident light Luv into the red light Lr. Further, the second color converting layer 151 may include a phosphor that converts the incident light Luv into the green light Lg. In addition, the third color converting layer 161*a* may include a phosphor that converts the incident light Luv into the blue light Lb The band pass filter layer 170 may be disposed on the first through third color converting layers 141, 151, and 161*a*, may selectively transmit the incident light Luv therethrough, and reflect the red light Lr, the green light Lg, and the blue light Lb emitted from the first, second and third color converting layers 141, 151, and 161*a*, such that the red light Lr, the green light Lg, and the blue light Lb are emitted toward the substrate 110.

Figure 8:
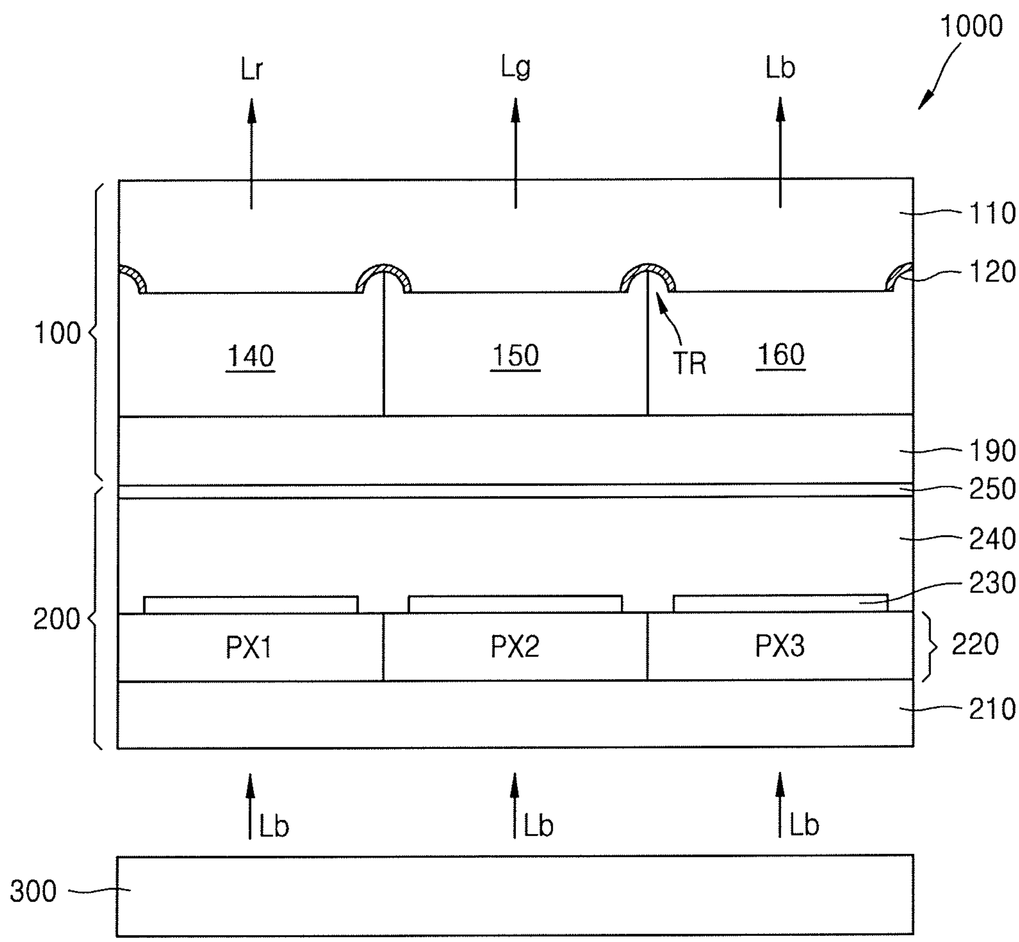
FIG. 8 is a cross-sectional diagram showing a structure of a display device according to an exemplary embodiment of the present invention.

FIG. 8 is a cross-sectional diagram showing a structure of a display device 1000 according to an exemplary embodiment of the present invention.

Referring to FIG. 8, the display device 1000 includes a backlight device 300, a liquid crystal display panel 200, and the color filter 100. For example, the color filter 100 is the color filter 100 shown in FIGS. 1 through 3, but may be replaced with any one of the color filters 100*a* through 100*h* according to exemplary embodiments of the present invention described above.

The backlight device 300 may provide light for forming an image to the liquid crystal display panel 200. The backlight device 300 may include, for example, a light source that emits light of a third color, e.g., the blue light Lb. According to an example, the backlight device 300 may include a light source that emits, for example, ultraviolet light. In this case, the color filter 100*h* shown in FIG. 7A may be used instead of the color filter 100*b*.

The liquid crystal display panel 200 includes a lower substrate 210, a pixel circuit 220 disposed on the lower substrate 210, pixel electrodes 230, a liquid crystal layer 240, and a common electrode 250. The pixel circuit 220 includes first through third pixels PX1, PX2, and PX3. The first through third pixels PX1, PX2, and PX3 control the pixel electrodes 230 located on the first through third pixels PX1, PX2, and PX3, respectively.

The color filter 100 color-converts a portion of the light Lb of the third color emitted from the backlight device 300 and transmitted through the liquid crystal display panel 200. The color filter 100 emits the light Lr of the first color and the light Lg of the second color to the outside, and emits a portion of the light Lb of the third color to the outside without color conversion.

The lower substrate 210 may include glass or a transparent plastic material. A lower polarizer may be disposed on the bottom surface of the lower substrate 210 for transmitting only a specifically polarized light from among light emitted from the backlight device 300. For example, the lower polarizer may be a polarizer that transmits therethrough light that is linearly polarized in the first direction.

The pixel circuit 220 may include a plurality of thin-film transistors and a gate wire and a data wire for applying a gate signal and a data signal to each of the plurality of thin-film transistors.

The pixel electrode 230 may be connected to a source electrode or a drain electrode of the thin-film transistor included in the pixel circuit 220 to receive a data voltage.

The common electrode 250 may be disposed on the planarizing layer 190. An upper polarizer may be disposed between the planarizing layer 190 and the common electrode 250. The upper polarizer may be a polarizing plate that transmits therethrough light that is linearly polarized in a second direction perpendicular to light that is linearly polarized in the first direction and that is transmitted through the lower polarizer. However, it is merely an example, and the upper polarizer and the lower polarizer may be configured to transmit light of a same polarization.

The liquid crystal layer 240 is disposed between the pixel electrode 230 and the common electrode 250 and includes liquid crystal molecules. The arrangement of the liquid crystal molecules is controlled according to a voltage applied to the pixel electrode 230 and the common electrode 250 to generate an electric field in the liquid crystal layer 240 to control the orientation of the liquid crystal molecules. In other words, according to a voltage applied to the pixel electrode 230 and the common electrode 250, the liquid crystal layer 240 between the pixel electrode 230 and the common electrode 250 is controlled to change to a mode for changing a polarization of incident light or to a mode off for not changing polarization of incident light. Furthermore, a degree of changing the polarization of incident light is adjusted, and thus halftones may be expressed.

The light Lb of the third color controlled by the liquid crystal layer 240 above the first pixel PX1 is converted into the light Lr of the first color when transmitted through the first color converter 140 and is emitted to the outside through the substrate 110. The light Lb of the third color controlled by the liquid crystal layer 240 above the second pixel PX2 is converted into the light Lg of the second color through the second color converter 150 and is emitted to the outside through the substrate 110. The light Lb of the third color controlled by the liquid crystal layer 240 above the third pixel PX3 is emitted to the outside through the substrate 110 without color conversion through the light emitter 160.

The color filter 100 includes the substrate 110, the first through third pixel areas PA1, PA2, and PA3 for forming different colors, and the first color converter 140, the second color converter 150, and the light emitter 160 disposed respectively in the first through third pixel areas PA1, PA2, and PA3. The substrate 110 has the trench TR between each of the pixel areas PA1, PA2 and PA3. Further, the color filter 100 includes the light blocker 120 disposed on the inner wall of the trench TR. The light blocker 120 may have a convex first surface in contact with the inner wall of the trench TR and a concave second surface opposite to the first surface. The convex first surface may be facing away from the backlight device 300. The concave second surface may correspond to a shape of the trench TR.

The first color converter 140 may be disposed on the first pixel area PA1 and convert the blue light Lb into the red light Lr, the second color converter 150 may be disposed on the second pixel area PA2 and convert the blue light Lb into the green light Lg, and the light emitter 160 may be disposed on the third pixel area PA3 and transmit the blue light Lb therethrough.

As the blue light Lb emitted from the backlight device 300 passes through the liquid crystal display panel 200, the blue light Lb is turned on or off according to image information, enters into the color filter 100, and is converted into the red light Lr, the green light Lg, and the blue light Lb. As a result, a color image is displayed according to the image information.

Since the light blocker 120 is disposed in the light blocking area BA between the first color converter 140, the second color converter 150 and the light-emitter 160, color mixture may be prevented and external light reflection may be reduced. As a result, color reproducibility may be increased and light efficiency may be increased. Thus, power consumption may be reduced.

Although FIG. 8 shows that the liquid crystal display panel 200 is disposed between the backlight device 300 and the color filter 100, the color filter 100 may be located between the backlight device 300 and the liquid crystal display panel 200 according to an exemplary embodiment of the present invention.

Although FIG. 8 shows that the color filter 100 shown in FIG. 2 is turned upside down and disposed on the liquid crystal display panel 200, the color filter 100 may not be turned upside down and the substrate 110 may be disposed on the liquid crystal display panel 200 according to an exemplary embodiment of the present invention.

Figure 9:
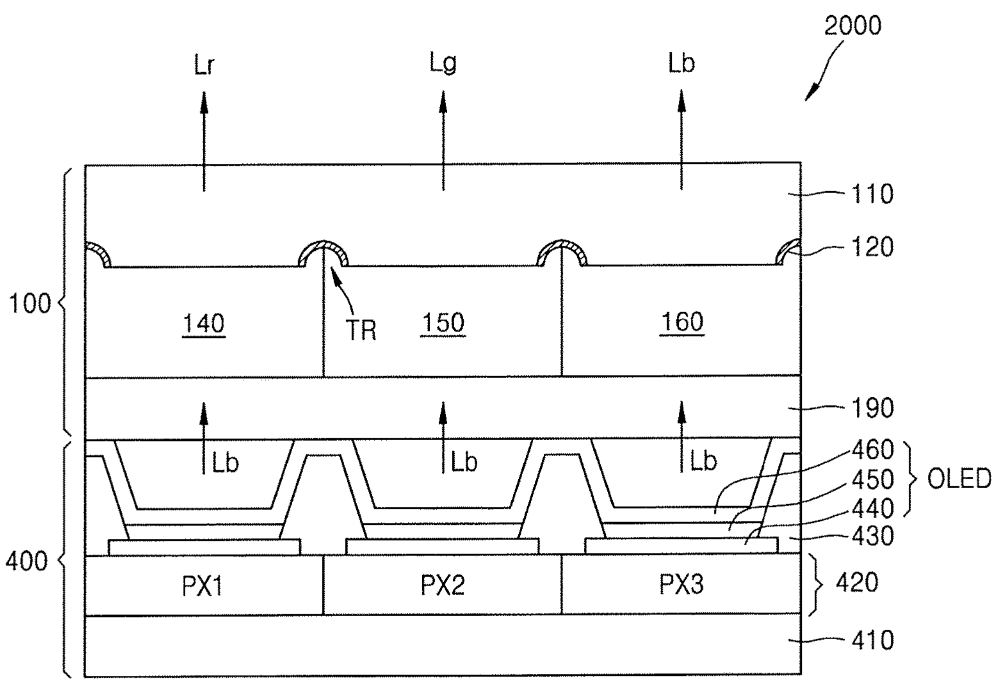
FIG. 9 is a cross-sectional diagram showing a structure of a display device according to exemplary embodiment of the present invention.

FIG. 9 is a cross-sectional diagram showing a structure of a display device 2000 according to an exemplary embodiment of the present invention.

Referring to FIG. 9, the display device 2000 includes an organic light-emitting display panel 400 and the color filter 100.

The organic light-emitting display panel 400 includes the first through third pixels PX1, PX2, and PX3 and includes organic light-emitting devices OLED controlled by the first through third pixels PX1, PX2 and PX3, respectively. The organic light-emitting devices OLED may emit light of a third color (e.g., the blue light Lb) having an amount of light controlled by the first through third pixels PX1, PX2 and PX3, respectively.

The color filter 100 may color-convert some of the light Lb of a third color emitted from the organic light-emitting devices OLED to emit the light Lr of the first color and the light Lg of the second color to the outside, and to emit some of the light Lb of a third color to the outside without color conversion.

According to an exemplary embodiment of the present invention, the organic light-emitting devices OLED may emit ultraviolet light. In this case, the color filter 100*h* shown in FIGS. 7A and 7B may be used instead of the color filter 100.

A substrate 410 may include glass, a metal, or an organic material.

A pixel circuit layer 420 including the first through third pixels PX1, PX2, and PX3 is disposed on the substrate 410. Each of the first through third pixels PX1, PX2, and PX3 includes a plurality of thin-film transistors and a storage capacitor. The pixel circuit layer 420 includes signal lines and power lines for transferring signals and driving voltages applied to the pixels PX1, PX2, and PX3 other than the pixels PX1, PX2, PX3 illustrated in FIG. 8.

Each of the thin-film transistors may include a semiconductor layer, a gate electrode, a source electrode, and a drain electrode. The semiconductor layer may include amorphous silicon or polycrystalline silicon. The semiconductor layer may include an oxide semiconductor. The semiconductor layer includes a channel area and a source area and a drain area that are doped with an impurity.

Pixel electrodes 440 are disposed on the pixel circuit layer 420. The pixel electrode 440 may be connected to a source electrode or a drain electrode of the thin-film transistor. The pixel electrode 440 is exposed in an opening of a pixel defining film 430 disposed on the pixel circuit layer 420 and the edges of the pixel electrode 440 may be covered by the pixel defining film 430.

An intermediate layer 450 is disposed on the pixel electrodes 440 exposed by opening of the pixel defining film 430. The intermediate layer 450 includes an organic emission layer, and the organic emission layer may include a monomer organic material or a polymer organic material. Selectively, the intermediate layer 450 may include functional layers, such as a hole transport layer (HTL), a hole injection layer (HIL), an electron transport layer (ETL), and an electron injection layer (EIL), other than the organic emission layer.

A counter electrode 460 is disposed on the intermediate layer 450 to cover the intermediate layer 450 and the pixel defining film 430.

The counter electrode 460 may be a transparent or semi-transparent electrode. For example, the counter electrode 460 may include a metal thin-film having a small work function. The counter electrode 460 may include a transparent conductive oxide (TCO).

The pixel electrode 440, the intermediate layer 450, and the counter electrode 460 constitute an organic light-emitting device OLED.

The light Lb of the third color emitted from the first organic light-emitting device OLED controlled by the first pixel PX1 is converted into light Lr of the first color through the first color converter 140 and is emitted to the outside through the substrate 110. The light Lb of the third color emitted from the second organic light-emitting device OLED controlled by the second pixel PX2 is converted into the light Lg of the second color through the second color converter 150 and is emitted to the outside through the substrate 110. The light Lb of the third color emitted from the third organic light-emitting device OLED controlled by the third pixel PX3 is emitted to the outside through the substrate 110 without color conversion through the light emitter 160.

The color filter 100 includes the substrate 110, the first through third pixel areas PA1, PA2, and PA3 for forming different colors, and the first color converter 140, the second color converter 150, and the light-emitter 160 on the first through third pixel areas PA1, PA2, and PA3. The substrate 110 has the trench TR formed in the light blocking area BA between each of the pixel areas PA1, PA2 and PA3. Further, the color filter 100 has the light blocker 120 disposed on the inner wall of the trench TR. The light blocker 120 may have a first convex surface in contact with the inner wall of the trench TR and a second concave second surface opposite to the first surface.

The first color converter 140 may be disposed on the first pixel area PA1 and convert the blue light Lb into the red light Lr. The second color converter 150 may be disposed on the second pixel area PA2 and convert the blue light Lb into the green light Lg. The light emitter 160 may be disposed on the third pixel area PA3 and transmit the blue light Lb therethrough.

The blue light Lb emitted from the organic light-emitting display panel 400 is incident to the color filter 100 and converted into red light Lr, the green light Lg and the blue light Lb, thereby displaying a color image Since the light blocker 120 is disposed in the light blocking area BA between the first color conversion section 140, the second color conversion section 150, and the light-emitting section 160, color mixture may be prevented and external light reflection may be reduced. As a result, color reproducibility may be increased and light efficiency may be increased, and thus power consumption may be reduced.

Although FIG. 9 shows that the color filter 100 is disposed on the organic light-emitting display panel 400, when the organic light-emitting display panel 400 is a bottom emission type, the organic light-emitting display panel 400 may be disposed on the color filter 100.

Although FIG. 9 shows that the color filter 100 shown in FIG. 2 is turned upside down and disposed on the organic light-emitting display panel 400, the color filter 100 might not be turned upside down and the substrate 110 may be disposed on the organic light-emitting display panel 400.

According to an exemplary embodiment of the present invention, lights emitted from adjacent color converting layers are reflected by the concave inner surface of light blocker disposed on the inner wall of a trench formed in a light blocking area of a substrate and are reflected back to the color converting layers. Thus, color reproducibility may be increased and light efficiency may be increased. Since the outside light incident to the convex outer surface of the light blocker may be irregularly reflected, an amount of reflected light sensed by eyes of a viewer may be reduced. Therefore, a display device with increased color reproducibility may be provided.

While the present invention has been particularly shown and described with reference to exemplary embodiments thereof, it will be apparent to those of ordinary skill in the art that various changes in form and detail may be made thereto without departing from the spirit and scope of the present invention as defined by the following claims.

What is claimed is:

1. A color filter comprising:

a substrate comprising a first surface having a first pixel area and a second pixel area spaced apart from each other and a light blocking area positioned between the first pixel area and the second pixel area, wherein the light blocking area includes a trench, wherein the trench extends into the substrate;

a first color converter disposed on the first pixel area and configured to convert incident light to light of a first color;

a second color converter disposed on the second pixel area and configured to convert the incident light to light of a second color; and a light blocker disposed in the trench.

2. The color filter of claim 1, wherein the light blocker comprises a first surface, which is in contact with an inner wall of the trench and is convex, and a second surface, which faces the first surface and is concave.

3. The color filter of claim 1, wherein a depth of the trench is constant across a base of the trench.

4. The color filter of claim 1, wherein a width of the trench decreases from a side of the trench to a center of the trench.

5. The color filter of claim 1, wherein the light blocker comprises a first surface contacting an inner wall of the trench and a second surface, wherein the second surface is opposite to the first surface and is flat.

6. The color filter of claim 1, wherein the first color converter comprises a first color converting layer having first quantum dots that are excited by the incident light and emit the light of the first color, and the second color converter comprises a second color converting layer having second quantum dots that are excited by the incident light and emit the light of the second color.

7. The color filter of claim 6, further comprising a color filter layer disposed between the substrate and the first and second color converting layers, wherein the color filter layer is configured to reflect the incident light.

8. The color filter of claim 6, further comprising a band pass filter layer disposed on the first and second color converting layers and configured to selectively transmit the incident light therethrough and reflect the light of the first color and the light of the second color.

9. The color filter of claim 8, further comprising a light-blocking sidewall disposed on a portion of the band pass filter layer to surround at least portions of the first and second color converting layers.

10. The color filter of claim 8, wherein the first color converter further comprises a first light-blocking layer disposed between a sidewall of the first color converting layer and the band pass filter layer, and the second color converter further comprises a second light-blocking layer disposed between a sidewall of the second color converting layer and the band pass filter layer.

11. The color filter of claim 6, further comprising:

a light-blocking sidewall configured to surround at least portions of the first and second color converting layers; and a band pass filter layer disposed on the first and second color converting layers and the light-blocking sidewall, wherein the band pass filter is configured to selectively transmit the incident light therethrough.

12. The color filter of claim 6, wherein the first color converter further comprises a first color filter layer disposed between the substrate and the first color converting layer, the first color filter layer configured to selectively transmit the light of the first color emitted from the first color converting layer therethrough, and the second color converter further comprises a second color filter layer disposed between the substrate and the second color converting layer, the second color filter layer configured to selectively transmit the light of the second color emitted from the second color converting layer therethrough.

13. The color filter of claim 1, further comprising a light transmitting layer disposed on a third pixel area spaced apart from the first and second pixel areas, the light transmitting layer configured to transmit the incident light therethrough.

14. The color filter of claim 1, further comprising a third color converter disposed on a third pixel area spaced apart from the first and second pixel areas, the third color converter configured to convert the incident light to light of a third color.

15. The color filter of claim 1, wherein the incident light is blue light or ultraviolet light, and the first color and the second color are red and green, respectively.

16. A display apparatus comprising:

a display comprising first and second pixels; and a color filter overlapping the display and comprising a first pixel area and a second pixel area, wherein the first pixel area and the second pixel area overlap the first pixel and the second pixel, respectively, wherein the color filter comprises:

a substrate comprising a first surface having the first pixel area and the second pixel area spaced apart from each other and a light blocking area positioned between the first pixel area and the second pixel area, wherein a trench is provided in the light blocking area;

a first color converter disposed on the first pixel area and configured to convert incident light to light of a first color;

a second color converter disposed on the second pixel area and configured to convert the incident light to light of a second color; and a light blocker disposed in the trench.

17. The display apparatus of claim 16, wherein the light blocker comprises a first surface, which is in contact with an inner of the trench and is convex, and a second surface, which faces the first surface and is concave.

18. The display apparatus of claim 17, further comprising:

a backlight device configured to irradiate the incident light toward the color filter; and a liquid crystal layer disposed between the first and second pixels and the color filter.

19. The display apparatus of claim 17, wherein each of the first and second pixels comprises an organic emission layer configured to emit the incident light.

20. A color filter comprising:

a substrate comprising a first pixel area and a second pixel area and a light blocking area positioned between the first and second pixel areas, wherein the light blocking area includes a recessed region;

a first color converting layer including a first plurality of quantum dots and disposed on the first pixel area;

a second color converting layer including a second plurality of quantum dots and disposed on the second pixel area; and a light blocker disposed in the recessed region, wherein the light blocker is partially overlapped by the first color converting layer and second color converting layer.

* * * * *